United States Patent
Martin et al.

(10) Patent No.: US 7,669,002 B1
(45) Date of Patent: *Feb. 23, 2010

(54) SYSTEM AND METHOD FOR PROVIDING AN APPLICATION WITH MEMORY ACCESS METHODS

(75) Inventors: David Martin, Jonesborough, TN (US); C. Eric Gibson, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/635,117

(22) Filed: Dec. 7, 2006

Related U.S. Application Data (63) Continuation of application No. 11/058,667, filed on Feb. 15, 2005, now Pat. No. 7,516,265.

(60) Provisional application No. 60/553,013, filed on Mar. 12, 2004.

(51) Int. Cl.
*G06F 12/00* (2006.01)
*G05B 19/18* (2006.01)

(52) U.S. Cl. ............... 711/100; 711/104; 711/112; 711/147; 711/144; 700/5; 700/18; 700/86; 700/87; 365/230.05

(58) Field of Classification Search ............... 700/87, 700/5, 205, 18–20, 83, 86–88; 370/463; 710/110; 709/250, 249; 711/100, 104, 112, 711/147, 149, 131; 360/230.05
See application file for complete search history.

(56) References Cited

U.S. PATENT DOCUMENTS

| | | | |
|---|---|---|---|
| 6,622,203 B2 * | 9/2003 | Simmons et al. | 711/105 |
| 6,675,226 B1 * | 1/2004 | Nair et al. | 709/250 |
| 7,042,899 B1 * | 5/2006 | Vaida et al. | 370/463 |
| 2003/0023336 A1 * | 1/2003 | Kreidler et al. | 700/108 |
| 2004/0030438 A1 * | 2/2004 | Popp et al. | 700/122 |
| 2005/0110518 A1 * | 5/2005 | Kanno et al. | 326/39 |
| 2005/0113941 A1 * | 5/2005 | Ii et al. | 700/19 |
| 2005/0203648 A1 * | 9/2005 | Martin | 700/87 |

* cited by examiner

*Primary Examiner*—Kidest Bahta
(74) *Attorney, Agent, or Firm*—Jose de la Rosa (57) ABSTRACT

A system for providing an application with a plurality of methods for accessing memory of a programmable logic controller includes an application, an interface for establishing communication between the application and a programmable logic controller, and a shared memory area initiated by the application or the programmable logic controller. The shared memory area includes an input memory and an output memory. The application is enabled by the interface to write to the input memory and to read from the output memory.

8 Claims, 5 Drawing Sheets

SYSTEM AND METHOD FOR PROVIDING AN APPLICATION WITH MEMORY ACCESS METHODS

CROSS-REFERENCE TO RELATED APPLICATIONS

This application is a continuation of U.S. patent application Ser. No. 11/058,667, filed 15 Feb. 2005 now U.S. Pat. No. 7,516,265, which claims benefit of U.S. Provisional Patent Application Ser. No. 60/553,013, filed Mar. 12, 2004.

FIELD OF THE INVENTION

The present invention relates to a programmable logic controller (PLC). More specifically, the invention is directed to providing an application with a plurality of PLC memory access methods.

BACKGROUND OF THE INVENTION

Programmable logic controllers (PLC's) are commonly used in process control technology. As a part of process control, a PLC is used to monitor input signals from a variety of input points (input sensors), which report events and conditions occurring in a controlled process. A control program stored in memory of an operating system within the PLC enhances the PLC operating system by creating an environment in which other programs are run. Usually one of these programs in concert with the control program instructs the PLC what actions to take upon encountering particular input signals or conditions. For example, the PLC can monitor input conditions such as motor speed, temperature, pressure, volumetric flow and the like. The PLC can issue output signals to speed up or slow down a conveyer, rotate the arm of a robot, open or close a relay, raise or lower temperature as well as numerous other control functions. Input and outpoint points and related devices, signals, conditions and processes are generally referred to as "I/O" in the industry.

"Soft PLC" programs allow a high-end desktop computer, often with multiple processors, to simulate the operation of a special purpose central control computer. Such a soft PLC program functions as a central processing unit (CPU) to execute programs written in, for example, relay-ladder language to control plug-in I/O modules communicating control signals between the desktop computer and the controlled process.

Figure 1:
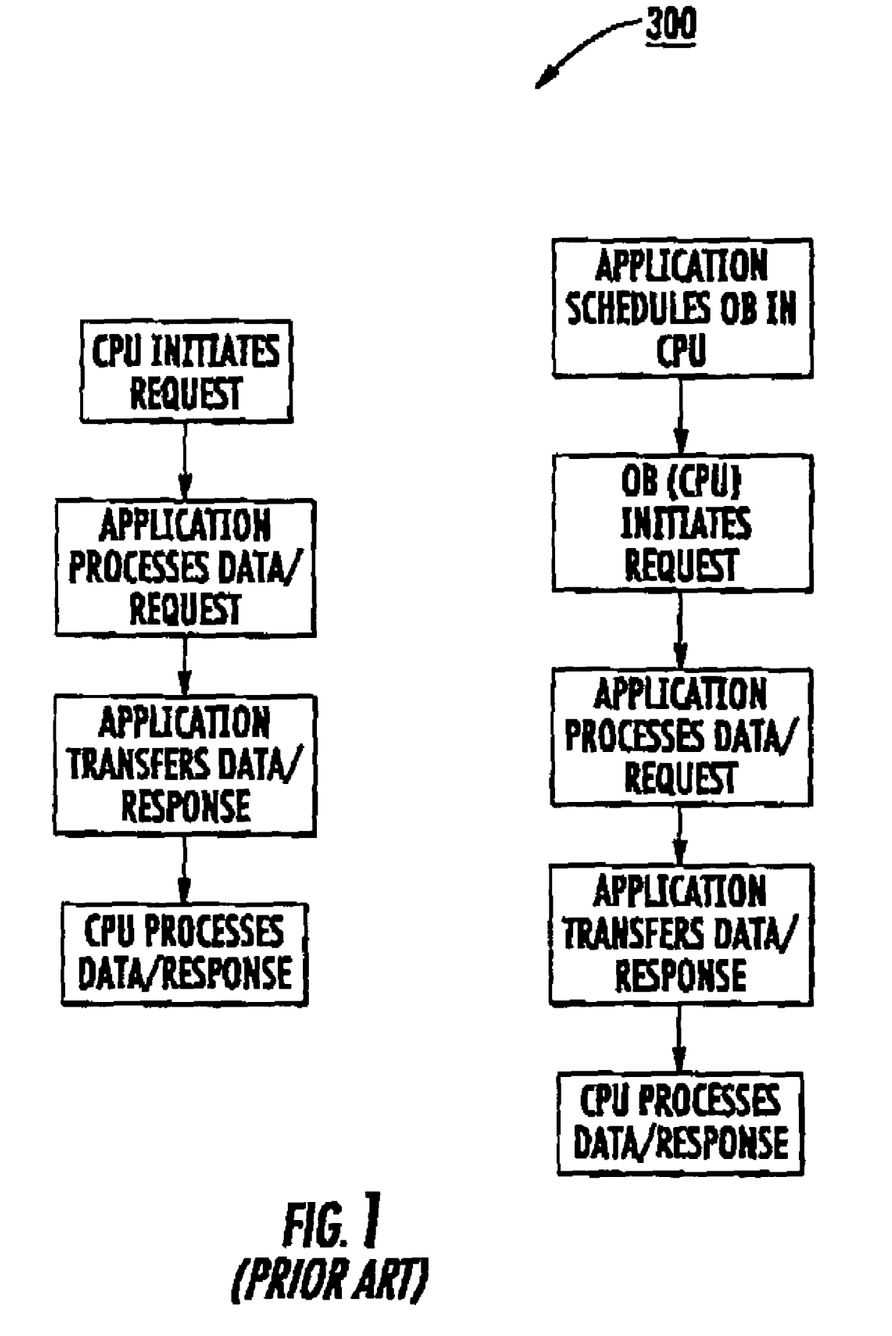
FIG. 1 is a flowchart of a conventional synchronous interface between a PLC and an application.

FIG. 1 particularly shows a conventional method for accessing PLC memory in a system 300. As shown, the control program in the PLC (CPU) initiates a data transfer to the external entity or application. Alternatively, the application "requests" data from the PLC by scheduling an Organizational Block (OB) in the PLC control program, which then initiates the data transfer between the PLC and the application. In either case, the PLC control program is responsible for capturing data in a scan cycle and determining when the data is transferred. This methodology is very synchronous in nature since each request/response sequence must be handled as a single step in the control program.

Figure 2:
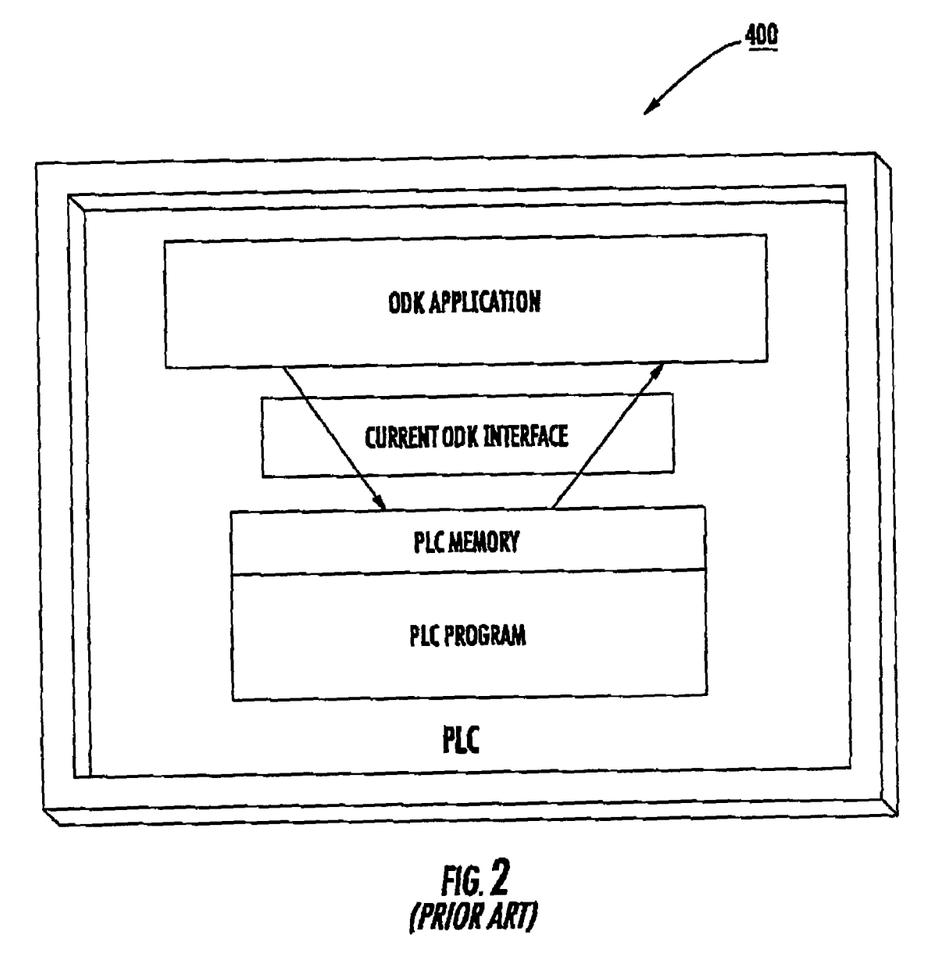
FIG. 2 is a system diagram showing conventional access to a PLC memory.

FIG. 2 is somewhat similar to FIG. 1. As shown in FIG. 2, a conventional interface 400 between the PLC and the external application is established by an external I/O device or via a software application. If established by the latter, at least a portion of the software application is loaded into and becomes part of the PLC in order to share data with the external application through the established software interface.

There is an unmet need in the industry for more flexible access to the memory of the PLC for third party devices and software. This accessibility needs to be able to be triggered based on input from the external entity to the PLC, needs to be asynchronous in nature, and needs to provide access to PLC memory on demand from external sources that are not physically part of the PLC.

BRIEF SUMMARY OF THE INVENTION

The present invention provides an additional interface to an Open Development Kit (ODK) that allows an external application to access PLC memory. The interface allows a customer to write to the PLC's input memory, for example, and to read from the PLC's output memory. This provides a way for external applications, independent of the PLC, to access the memory of the PLC.

More specifically, according to one aspect of the invention, a system for providing an application a plurality of methods for accessing memory of a programmable logic controller includes an application; interface means for establishing communication between the application and a programmable logic controller; and a shared memory area initiated by the application or the programmable logic controller, the shared memory area including an input memory and an output memory, the application enabled by the interface means to write to the input memory and to read from the output memory. In this aspect, the application can be located remotely from the programmable logic controller, such as at an operator workstation across a factory floor or an operations center thousands of mile away from the PLC. Also in this aspect, a control program can be implemented in the programmable logic controller for reading from the input memory and writing to the output memory. The application can access the input and output memories separately from the programmable logic controller.

The shared memory area in this aspect can be a duel port random access memory area. Also, each of the input memory and the output memory are four thousand bytes in one instance but can be larger or smaller according to developer choice and requirements.

The system can include at least one additional application. Each additional application has interface means for accessing the shared memory area as described above.

According to another aspect of the invention, a method for providing an application a plurality of memory access methods includes the steps of instantiating a peripheral input memory and a peripheral output memory in a shared memory area between a programmable logic controller and an application; establishing communication between the programmable logic controller and the application for a data exchange in the shared memory area; reading the data from the input memory; processing the data; and writing the data to the output memory. The input memory and the output memory in this aspect of the invention are input and output memory of the programmable logic controller. Also, the shared memory area is established by the programmable logic controller when triggered by the application.

The method can include additional steps of requesting a connection by the application to the programmable logic controller, and wherein if successful, receiving a handle to the programmable logic controller for use when reading and writing data to specify the programmable logic controller in communication with the application; reading or writing the data by the application; reading the data by the application from the peripheral output memory provided by the programmable logic controller; processing the data; and writing additional data by the external application to the peripheral input memory. The steps of reading and writing of the data are defined by data types supported by the programmable logic controller.

The method can include another step of requesting a connection by the application to the programmable logic controller, and if unsuccessful, requesting a connection again for a predetermined period of time. Further steps can include establishing communication between an additional application and the shared memory area; requesting one or more additional connections by the additional application to the programmable logic controller, and wherein if successful, receiving an additional handle to the programmable logic controller for use when reading and writing data to specify which programmable logic controller the additional application is reading and writing data from; and accessing the data by the additional application. By way of example but not limitation, the shared memory area can include a duel port random access memory.

In yet another aspect of the invention, a system for providing an application access to memory of a programmable logic controller includes an application separate from a programmable logic controller; interface means for establishing communication between the application and the programmable logic controller; and a shared memory area implemented by the programmable logic controller triggered by an input from the application, the shared memory area including an input memory and an output memory, the application enabled by the interface means to write to the input memory and to read from the output memory. The application in this aspect can access the input and output memories separately from the programmable logic controller. Also, the application and the programmable logic controller communicate via a handle, which specifies to the application which programmable logic controller the application is reading and writing data. Additionally, the data is a data type supported by the programmable logic controller.

BRIEF DESCRIPTION OF THE DRAWINGS

A full and enabling disclosure, including the best mode thereof to one of ordinary skill in the art, is set forth more particularly in the remainder of the specification, including reference to the accompanying figures in which.

DETAILED DESCRIPTION

Detailed reference will now be made to the drawings in which examples embodying the present invention are shown. Repeat use of reference characters in the drawings and detailed description is intended to represent like or analogous features or elements of the present invention.

The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

DEFINITIONS

As used herein, the term "interface" is used to mean a working connection between at least two entities that may be physical or more often, metaphysical, and more particularly, the interface provides a protocol or mechanism by which the abstract concept of a working connection is made. By way of example, a Dynamic Linked Library (DLL) can be used to establish the interface. DLL is a type of file used with Microsoft® Windows®, Windows® software programs, and Windows® drivers. DLL files allow executable code modules to be loaded on demand, linked at run time, and unloaded when not needed. Specifically, DLL files contain one or more executable subroutines that can be called by one or more programs to perform routine tasks. Thus, DLL files enable software developers to use Microsoft® or other companies' routines to perform common tasks and avoid unnecessary duplication of commonly used code. The interface of the present invention is not, however, limited to DLL files. For instance, analogous interfaces are available using UNIX®, Mac OS®, Linux® or other operating systems. Moreover, the interface as described below can be used to establish a passive communication portal between two or more entities, or the interface can be dynamic or active such as an executable.

As used herein, the term "ODK" is used to mean an Open Development Kit, which enables a user to create custom software that interacts directly and asynchronously with a programmable logic controller such as a Windows® Logic Controller (WinLC™). By way of example, a Windows®-based SIMATIC® WinAC® control system, which combines automation tasks such as control, data processing, communication, visualization, and technology on a computer, provides a series of open interfaces to integrate real-time process data with subsequently loaded software applications. A WinAC® ODK enables user-developed extensions, special purpose libraries and add-ins to integrate motion, vision and user-defined C/C++ code with the logic control scan of the WinAC® control system. While the ODK can load DLLs using a "C" interface, the ODK can also use Component Object Model (COM) technology available from Microsoft® Corporation.

The ODK of the present invention can expand the capabilities of WinLC™ using special control logic that was written in C or C++, which needs to be incorporated into a STEP 7 PLC. Also, a complex (or proprietary) calculation (such as required in Proportional, Integral, Derivative (PID) controllers or with gas flow) that either has higher performance requirements or is more easily written and maintained in C or C++ can be more easily accommodated with the present ODK. Further, the ODK provides a control solution for connectivity with another application or hardware, such as for motion control or vision systems. The ODK also provides a control solution to access features of the associated processing unit or operating system, which are not accessible by standard STEP 7 CPU mechanisms.

Thus, the ODK provides a mechanism for defining custom logic; i.e., system functions. For example, without using an ODK, a process that uses a motion control board and a vision board might have a custom application that interacts between the two boards. The custom application therefore interacts with WinLC™ by manipulating the I/O controlled by WinLC™ through asynchronous read/write functions provided by STEP 7 or by the data control of WinAC® Computing. By using the ODK, the custom application can interact directly with the program logic.

As used herein, the term "asynchronous" is used to mean that which is outside of a conventional scan of a PLC and more particularly, to mean real time monitoring and direct access to the PLC by an application at anytime.

As used herein, the term "application" is used to mean software or a device that is external to the PLC, unless otherwise indicated.

As used herein, the term "a" can mean one or more than one, and the term "plurality" can mean one or more than one, unless other indicated.

DESCRIPTION OF THE DRAWINGS

Figure 3:
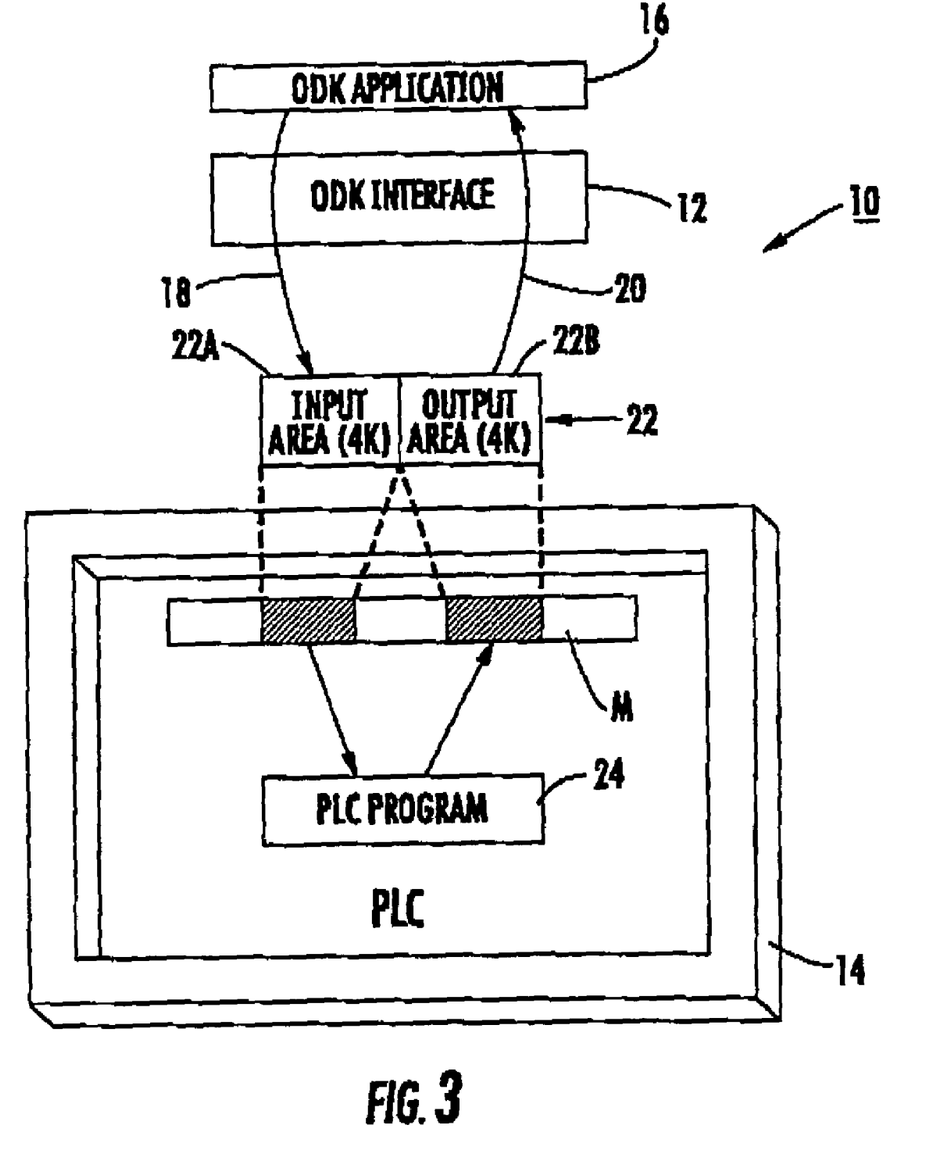
FIG. 3 is a system diagram showing implementation a shared memory area according to an aspect of the present invention.
Figure 4:
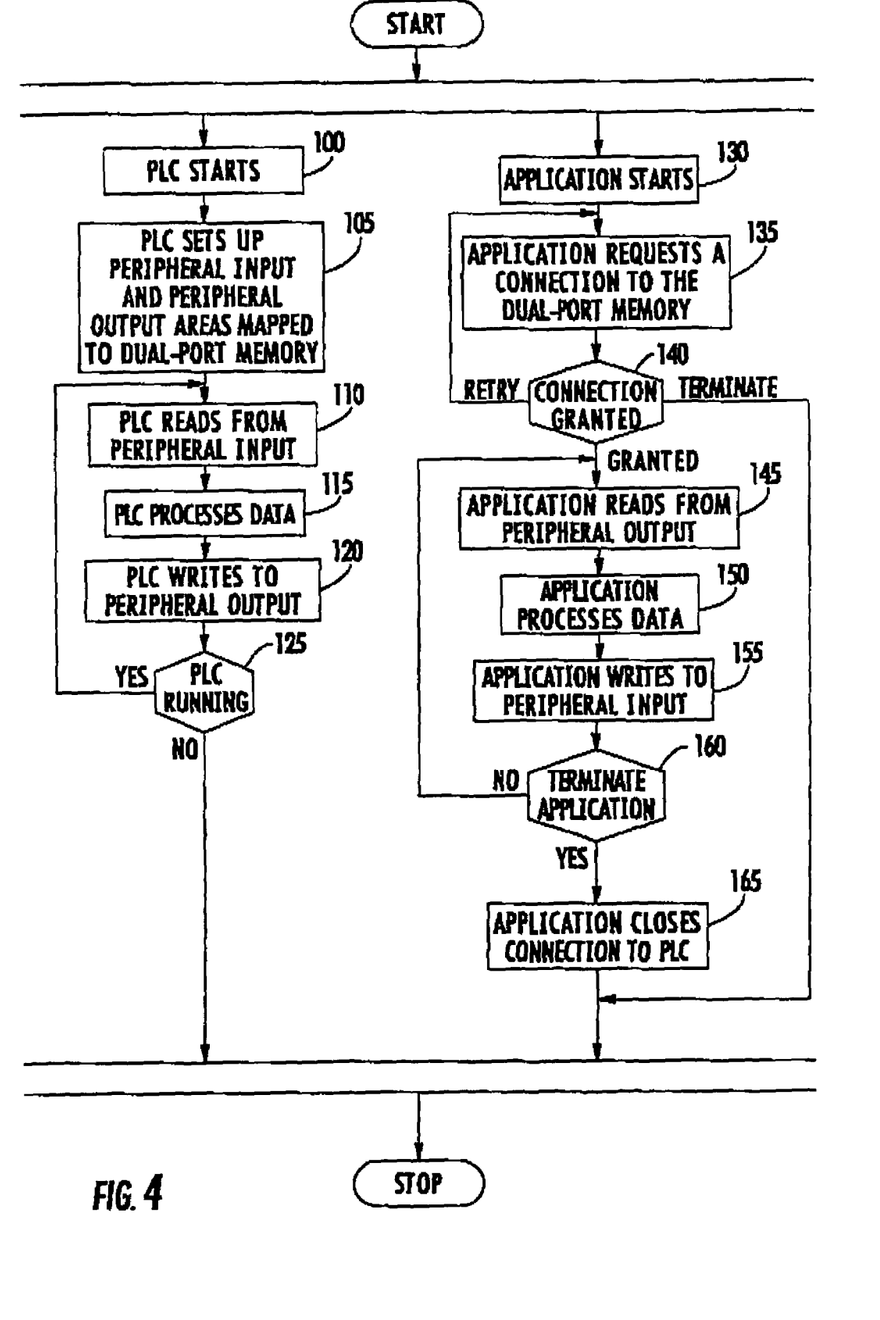
FIG. 4 is a flowchart showing steps in a process according to another aspect of the present invention.

The invention broadly shown in FIGS. 3 and 4 includes a system 10 having an interface 12 in an ODK-type product that allows for expansion of capabilities of a PLC 14. More specifically, the system 10 permits incorporation of custom code that is part of an external application 16. The external application 16 is an executable, for instance, that is capable of running on its own. The external application 16 will of course access a portion of the PLC 14 such as its memory when the PLC 14 is active. Additionally, the application 16 must implement the interface 12 expected by the PLC 14 so that communication such as a data transfer can occur between the PLC 14 and the application 16. Details of enhancements to the ODK interface 12 to establish this communication are described below.

With particular reference to FIG. 3, two parallel streams of control or communication are shown, respectively external application and PLC streams 18, 20. The PLC and the external application streams 18, 20 can both operate without the other stream being present and active. The only shared point between the two streams 18, 20 is a shared memory area 22. In this example, the shared memory area 22 is a dual port RAM (DPRAM) interface. The shared memory area or interface 22 includes an exemplary four kilobytes (4K) Peripheral Input 22A and an exemplary 4K Peripheral Output 22B. Those skilled in the industry will recognize that the shared memory interface 22 is implemented by hardware in slot PLCs and implemented by software in Soft PLCs. It will be further appreciated that the input and output 22A, 22B is not limited to 4K; i.e., the input and output 22A, 22B can be as large or as small as a developer chooses such as 64K, 1G, etcetera. Further, the interface 22 can be expanded to include more than one set of I/O in addition to the exemplary input and output 22A, 22B.

As shown in FIG. 3, the shared memory interface 22 is memory allocated by a control program 24 of the PLC 14. As described by example operation below, the data transfer between the PLC 14 and the external application 16 takes place as the PLC 14 and the external application 16 read and write to the shared memory interface 22.

FIG. 4 shows an exemplary operation of the ODK-type system 10. In general, a PLC stream 100-125 is shown on a left side of FIG. 4, which defines what actions occur in the PLC 14. An application stream 130-165 is shown on a right side, which defines actions that occur in or are taken by the external application 16.

With initial reference to the PLC stream 100-125, the PLC 14 is started at step 100. The PLC 14 next sets up the shared memory interface 22 at step 105, including, for example, the 4K of peripheral input memory 22A and the 4K of peripheral output memory 22B. As discussed below, set up of the shared memory interface 22 by the PLC 14 assumes that the external application 16 has not first requested or triggered the set up. In either case, the shared memory interface 22 is reserved for the use of data transfer between the external application 16 and the PLC 14. Once the shared memory interface 22 is instantiated, it is reserved for the external application 16 to use.

As shown in FIG. 4, the PLC 14 will read from the peripheral input area 22A according to step 110, process the data at step 115, and write to the peripheral output area 22B at step 120. This is similar to PLC activity for other memory areas, represented in general by the letter M. As long as the PLC 14 remains running at step 125, the foregoing process will continue.

Turning now to the right side of FIG. 4, the external application 16 is started at step 130. It is not necessary for the PLC 14 to be running when the external application 16 is started, but as noted above, it will be necessary for the PLC 16 to be running for data transfer to take place. The external application 16 will request a connection via the external application interface 12 to the PLC 14 at step 135. This request will initiate or trigger set up of the shared memory interface 22 if not previously set up by the PLC 14. If the connection is successful, the external application 16 will receive a handle to the PLC 14, e.g., ODK_CallBack_Handle, which will be used in future reads and writes to specify which PLC (if more than one) the external application 16 is reading and writing.

With further reference to FIG. 4, the external application 16 can be setup according to an aspect of the invention so that at step 140, the external application 16 can repeatedly request a connection if, and each time, a request is unsuccessful. The connection request can be specified and occur for a number of times or until a connection is established. If the connection cannot be established, the external application 16 should terminate. If the connection is granted, the external application 16 can begin accessing data through the access methods provided by the external application interface 12. The access methods provide for easy access to the various data types that the PLC 14 supports.

More particularly, as shown in FIG. 4, the external application 16 will read data from the peripheral output area 22B of the PLC 14 at step 145, process the data at step 150, and write data back to the peripheral input area 22A of the PLC 14 as shown at step 155. All of these reads and writes are accomplished by the access methods provided by the external application interface 12, are PLC-specific and support the data types of the PLC 14. This process of data access will continue until the application 16 terminates at step 160. Before the application 16 completes its termination process, it should close the connection to the PLC 14 at step 165.

Figure 5:
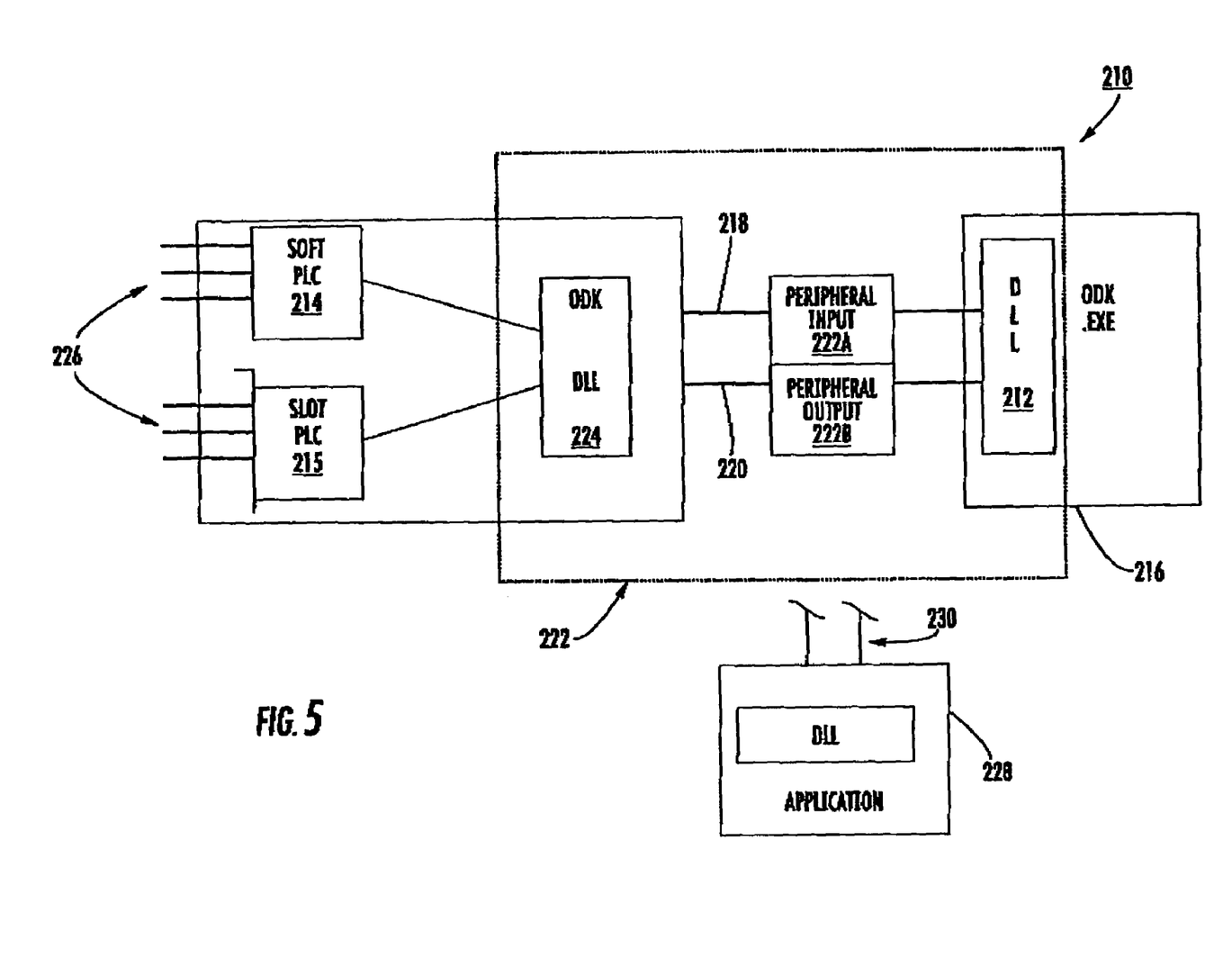
FIG. 5 is a schematic diagram of a system and method according to another aspect of the present invention.

According to another aspect of the invention shown in FIG. 5, more than one application 228 can access data from a PLC at a shared memory area 222 defining a peripheral input 222A and a peripheral output 222B. Specifically, once a soft PLC 214 or slot (hard) PLC 215 or an external application 216 has initiated and established the shared memory area 222, the additional external application 228 can request a connection via its application interface (e.g., a DLL) and its I/O 230 in order to access the shared memory area 222. The additional external application 228 can exchange data, for instance, with the PLC 214, 215 through the access methods substantially as described above. See, e.g., steps 135-155 in FIG. 4. As noted above, the accessed data can include motor speed, temperature, pressure, volumetric flow, commands to slow down a conveyer, rotate the arm of a robot, open or close a relay, raise or lower temperature, or the like flowing to and from such external devices from a variety of PLC I/O 226.

While various embodiments of the invention have been shown and described, the skilled artisan will recognize that many changes and modifications can be made to the foregoing embodiments without departing from the spirit and scope of the invention. For example, a PLC-equipped system according to the present invention can be programmed to perform an almost endless variety of functions. It will be further understood by those skilled in the art that multiple information exchanges between the PLC, controlled devices and applications can occur simultaneously, sequentially, and repetitively. Also, various program codes can be written using ladder logic, "C" language, object oriented program code such as C++, Java, or a number of other languages to suit a variety of these applications.

References, if used herein, referring to "master", "slave", "first," and "second" structures, elements, designations, geometries and the like are intended solely for purposes of providing an enabling disclosure and in no way suggest limitations regarding the operative orientation or order of operation of the exemplary embodiments or any components thereof. It is intended to claim all such changes and modifications as fall within the scope of the appended claims and their equivalents.

That which is claimed is:

1. A system comprising:
   an interface adapted to establish communication between an application and a control program of a programmable logic controller, said interface adapted to address a shared memory area initiated by said application or said control program of said programmable logic controller, said shared memory area including an input memory and an output memory, said application enabled by said interface to write input data only to said input memory and to read output data only from said output memory without directly communicating said input or said output data through said control program.

2. The system as defined in claim 1, further comprising: said shared memory area.

3. The system as defined in claim 1, wherein said application is disposed remotely from said programmable logic controller.

4. The system as defined in claim 1, further including said control program in said programmable logic controller, said control program adapted to read from said input memory and write to said output memory.

5. The system as defined in claim 1, wherein said application is configured to access said input and output memories separately from said programmable logic controller.

6. The system as defined in claim 1, wherein said shared memory area is a dual port random access memory area.

7. The system as defined in claim 1, wherein each of said input memory and said output memory are four thousand bytes.

8. The system as defined in claim 1, further comprising at least one additional application, each additional application having respective interface for accessing said shared memory area.

* * * * *

UNITED STATES PATENT AND TRADEMARK OFFICE
CERTIFICATE OF CORRECTION

PATENT NO. : 7,669,002 B1 Page 1 of 1
APPLICATION NO. : 11/635117
DATED : February 23, 2010
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Signed and Sealed this

Seventh Day of December, 2010

David J. Kappos
*Director of the United States Patent and Trademark Office*